United States Patent [19]
Green

[11] Patent Number: 5,954,583
[45] Date of Patent: Sep. 21, 1999

[54] SECURE ACCESS CONTROL SYSTEM

[75] Inventor: Graeme Allan Green, Canberra, Australia

[73] Assignee: COM21 Limited, Mitchell, Australia

[21] Appl. No.: 08/969,538

[22] Filed: Sep. 30, 1997

Related U.S. Application Data

[63] Continuation of application No. 08/433,341, May 5, 1995, abandoned.

[30] Foreign Application Priority Data

Nov. 5, 1992 [AU] Australia .................................. PL5700

[51] Int. Cl.$^6$ .................................. G07C 9/00; G07F 7/10
[52] U.S. Cl. .................................................. 463/29
[58] Field of Search .................................. 463/29, 25, 16; 364/412.1

[56] References Cited

U.S. PATENT DOCUMENTS

| | | |
|---|---|---|
| 4,154,114 | 5/1979 | Katz et al. . |
| 4,197,855 | 4/1980 | Lewin . |
| 4,575,622 | 3/1986 | Pellegrini . |
| 4,675,516 | 6/1987 | Guion . |
| 4,725,924 | 2/1988 | Juan . |
| 4,727,246 | 2/1988 | Hara et al. . |
| 4,733,061 | 3/1988 | Hegi . |
| 4,754,487 | 6/1988 | Newmuis . |
| 4,764,666 | 8/1988 | Bergeron ................................ 235/380 |
| 4,800,520 | 1/1989 | Iijima ..................................... 364/900 |
| 5,429,361 | 7/1995 | Raven et al. ........................ 273/138 A |

FOREIGN PATENT DOCUMENTS

| | | |
|---|---|---|
| 1896376 | 5/1978 | Australia . |
| 3271578 | 8/1979 | Australia ........................... G07F 7/08 |
| 2137788 | 4/1982 | Australia . |
| 8623382 | 1/1984 | Australia . |
| 2157383 | 6/1984 | Australia ........................... H04B 9/00 |
| 2594684 | 10/1984 | Australia ........................... G07F 17/34 |
| 5654686 | 11/1986 | Australia . |
| 5839986 | 1/1987 | Australia . |
| 7338887 | 12/1987 | Australia . |
| 3450489 | 3/1990 | Australia ........................ G07F 17/34 |
| 7265791 | 9/1991 | Australia ........................... G07F 7/08 |
| 8244091 | 3/1992 | Australia . |
| 8972191 | 6/1992 | Australia . |
| 25291 | 9/1992 | Australia ........................ G07F 17/34 |
| 0182244 | 5/1986 | European Pat. Off. .......... G07F 7/10 |
| 0219879 | 4/1987 | European Pat. Off. . |
| 0220703 | 5/1987 | European Pat. Off. . |
| 0234954 | 9/1987 | European Pat. Off. . |
| 0504616 | 9/1992 | European Pat. Off. .......... G07F 7/10 |
| 0531241 | 3/1993 | European Pat. Off. .......... G07C 1/30 |
| 8101664 | 6/1981 | WIPO ............................. A63B 71/06 |
| 8601318 | 2/1986 | WIPO . |
| 8605018 | 8/1986 | WIPO ............................... G06K 9/00 |
| WO 8707063 | 11/1987 | WIPO ............................... G07F 7/10 |

(List continued on next page.)

OTHER PUBLICATIONS

Proceedings 1988 Carnahan Conference on Scurity Technology: Electronic Crime Countermeasures, May 10–12, 1988, pp. 13–16.

Biometric Access & Use Systems, Mr. J. Rice and Mr. B. Goodwin, pp. 6/1–6/6.

*Primary Examiner*—Michael O'Neill
*Attorney, Agent, or Firm*—Michael D. Bednarek; Crowell & Moring LLP

[57] ABSTRACT

A secure access control system has a "smart" key assembly (25) with storage means (28) for storing identification data (29) and image data (30). An interface (31) provides communication between the key assembly (25) and an access control assembly (33) having a data processing assembly (44), a user interface assembly (45), a receiving slot (38) for the key assembly (25) and an identity verifier (39). The data processing assembly (44) is controlled by a central processor (34) and has data storage means (35). The user interface assembly has a keypad (36) and an LCD (37). The identity verifier (39) compares a sensed identification of a user with the image data (30) embedded in the key assembly (25).

6 Claims, 13 Drawing Sheets

FOREIGN PATENT DOCUMENTS

| | | | |
|---|---|---|---|
| 8906405 | 7/1989 | WIPO | G07F 17/32 |
| 9012371 | 10/1990 | WIPO . | |
| WO9012371 | 10/1990 | WIPO . | |
| 9014639 | 11/1990 | WIPO . | |
| 9106920 | 5/1991 | WIPO . | |
| 9107728 | 5/1991 | WIPO . | |
| WO9106920 | 5/1991 | WIPO . | |
| 9109369 | 6/1991 | WIPO | G06F 15/20 |
| WO 9109369 | 6/1991 | WIPO . | |
| 9204689 | 3/1992 | WIPO . | |
| WO9204689 | 3/1992 | WIPO . | |
| 9208202 | 5/1992 | WIPO . | |
| WO 9209973 | 6/1992 | WIPO | G06K 9/00 |

SECURE ACCESS CONTROL SYSTEM

This application is a continuation of application Ser. No. 08/433,341 filed May 5, 1995, now abandoned.

BACKGROUND OF INVENTION

This invention relates to a secure access control system.

The invention has particular but not exclusive application to a secure access control system for use in gaming establishments such as casinos and for illustrative purposes reference will be made herein to such an application. However it is to be understood that this invention can be used in many other applications, such as for example restricted area security, automatic teller machines, medical records, information retrieval etc, where control of access to only authorised users is important.

DESCRIPTION OF THE PRIOR ART

Secure access control systems are well known. It is known to provide mechanical and electronic locks or access barriers which are "releasable" when a personal identification number (PIN) is entered on a keypad by a user or when operated by use of an encoded card or key.

It is known to use such cards in conjunction with a PIN to provide access only to authorised users who can enter the correct PIN. These known secure access systems provide access to remote sites and are controlled by a centralised computer system. However if the centralised computer is inoperable at any time, the remote site facility is also inoperable.

It is also known to provide identification cards or security access devices which include memory and circuitry enabling the memory to be read from, written to or otherwise modified. Such cards can include electrically erasable programmable read only memory (EEPROM) and are known in the art as "smartcards". Such devices are disclosed in U.S. Pat. Nos. 4,675,516, 4,725,924, 4,727,246, 4,733,061 and 4,764,666.

The use of coin actuated gaming and amusement machines is well known. The administrative, labour and logistical problems associated with the management of the very large coin or token holdings in casinos and fun parlours has led to a requirement for gaming machines which are "cashless" in the sense that they are operated by a card or other device whereby the gaming machine is coin-freed. Australian patents 511904 and 613484 and Australian patent application 72657/91 illustrate such "cashless" equipment. The latter two disclose the use of smart cards such as those described above.

The management and audit functions in casinos and fun or amusement parlours is complex because of the large turnover, the large number of machines and the vast quantity of statistical information available for analysis. These functions may be performed manually by collating data manually extracted from each individual machine. However it is now not uncommon for this function to be carried out electronically either by a centralised computer facility connected to individual machines by a landline as exemplified in Australian patent 542455 and Australian patent application 72657/91, or by on-site down-loading from individual machines to a transportable data collector as exemplified in Australian patents 553309 and 613484. However failure of the central computer in systems using landlines can render individual machines inoperative. Furthermore in systems using on-site down-loading, security at individual machines can be compromised by the lack of a centralised control as this cannot be provided in the absence of on-line real time data.

SUMMARY OF THE INVENTION

The present invention aims to provide a useful alternative to known secure access control systems which will be reliable and efficient in use.

This invention in one aspect resides broadly in a secure access control system including:

at least one key assembly having a data processing assembly including processor means and data storage means controlled by the processor means to store data relating to the use of a key assembly by a user thereof, the data storage means receiving and storing visual identification image data representative of a visibly identifiable physical feature of a user's body for distinguishing a user authorised to use the key assembly;

at least one access control assembly adapted to receive a key assembly, the access control assembly having a data processing assembly including processor means and data storage means, and visual identity verification means for visual verification of the actual visibly identifiable physical feature of the user of a key assembly by comparison with the image of the visibly identifiable physical feature stored in the key assembly data storage means, and interface means whereby an access control assembly can communicate with a received key assembly;

whereby use of the key assembly by an unauthorised user is detectable.

As used herein the expression "key assembly" includes devices for permitting access by a user to a secure access system upon correct use of the device by the user. Cards and keys are examples of key assemblies. The secure access control system may include a central computer assembly and communication means for transferring data from the access control assemblies to the central computer assembly.

In one preferred embodiment the visual identity verification means includes optical sensing means for optically sensing the actual visibly identifiable physical feature, and a comparator for comparing the stored visual identification image data with data representative of the image of the actual visibly identifiable physical feature sensed by the optical sensing means.

Alternatively, the visual identity verification means may include image display means for displaying the visibly identifiable physical feature stored as image data in the key assembly data storage means, whereby an operator of the secure access control system can visually compare the displayed image with the actual physical feature of the user of the key assembly.

In a preferred embodiment the visibly identifiable physical feature is the human face.

In a preferred embodiment the access control assemblies include a user interface assembly operable by a user to input data to the access control assembly.

The user interface assembly can include any suitable means whereby the user is able to communicate with the access control assembly and it is preferred that the user interface assembly includes input means and information display means.

The input means could be a joy-stick or a mouse or a screen-based electronic pencil. Alternatively the input means can be a microphone for recording the voice instructions of a user. However it is preferred that the input means includes a keypad.

In a preferred embodiment the access control assembly includes receiving means for closely receiving and releasably retaining a key assembly whereby communication is established between the access control assembly and the key assembly by the interface means.

In a further aspect this invention resides broadly in a method of securing access, the method including:

providing a key assembly having a data processing assembly including data storage means for receiving and storing identification image data representative of an image for distinguishing a user authorised to use the key assembly;

inserting the key assembly in an access control assembly adapted to receive the key assembly and having a data processing assembly including processor means and data storage means whereby communication is established between the access control assembly and the key assembly, and verifying identification image data stored in the key assembly data storage means whereby use of the key assembly by an unauthorised user is detected.

In another aspect this invention resides broadly in an operating system for a plurality of gaming machines, the operating system including a secure access control system as defined above, wherein each gaming machine includes an access control assembly as described above. It is preferred that the access control assembly includes a user interface assembly as described above.

As used herein the expression "gaming machine" includes any device, assembly or apparatus operable by a user for the purpose of entertainment and gambling. Examples of gaming machines include poker machines, slot machines, pinball machines, roulette tables, blackjack machines, machines for playing bingo, lotto, jeuting and other similar lottery-type games, and TV sets and video screens programmed to facilitate gambling and the playing of amusement games.

In a further aspect this invention resides broadly in a gaming machine operating system including:

a plurality of gaming machines;

a central computer assembly;

communication means for transferring data from the gaming machines to the central computer assembly, and a secure access control system including:

for each user of the gaming machine system, a key assembly having a data processing assembly including processor means and data storage means controlled by the processor means to store data relating to the use of the key assembly by the user, the data storage means receiving and storing identification data representative of the user for distinguishing a user authorised to use the key assembly and/or the gaming machine system, and for each gaming machine in the gaming machine system, an access control assembly associated with the gaming machine and adapted to receive the key assembly, the access control assembly having user identity verification means for verification of the identity of a user of a key assembly by comparison with the identification data stored in the key assembly data storage means, and a processing assembly including processor means and data storage means controlled by the processor means to store data relating to the use of the gaming machine by the user, the data storage means also receiving and storing data representative of the gaming machine, and interface means for each gaming machine whereby an access control assembly can communicate with a received key assembly;

whereby in use in circumstances where the gaming machine cannot communicate with the central computer, access by a user not authorised to operate a gaming machine in the gaming machine system can be prevented and access by a user authorised to operate a gaming machine can be allowed, and if a user is allowed access to operate a gaming machine in these circumstances data relating to the use of the key assembly by the user during the circumstances is stored in both the data storage means, data stored in the access control assembly data storage means during the circumstances being transferable to the central computer by the communication means after cessation of the circumstances.

The gaming machines may be operable solely by coins and tokens in known manner, but it is preferred that the key assembly data storage means and the access control assembly data storage means each stores credit data representative of the credit held by a designated user, the credit data stored in the access control assembly data storage means being incremented or decremented when a financial event associated with the key assembly is completed.

As used herein the expression "financial event" means any transaction which increases or decreases the credit held by a designated user of the operating system. Events which increment the credit data storage means include a cash deposit and a gaming machine win by a user, and events which decrement the credit data storage means include operation of a gaming machine by a user and operation of the user interface assembly to access a paging system to provide a chargeable service to the user.

In a preferred embodiment the gaming machine is inoperable when the key assembly is received by the access control assembly. If the key assembly is not received in the access control assembly upon completion of a financial event associated therewith, the credit data stored in key assembly data storage means is incremented or decremented when the key assembly is next received in an access control assembly.

In a preferred embodiment the access control assembly includes a user interface assembly operable by a user to input data to the access control assembly.

The operating system may also include a paging system for transferring messages and paging signals from the gaming machines. In such an arrangement it is preferred that the user interface facility includes paging means whereby a user can access the paging system.

Gaming machines for use in the operating system of this invention may be custom-built for use therewith. However to enable older machines to be used in the operating system the gaming machines may include retrofit interface means for providing data transfer between an existing processor unit in an existing gaming machine and the access control assembly in the gaming machine. In the case of older machines which may not allow access to the processor unit the retrofit interface means may provide data transfer between photo-optic coin sensors, solenoid switches and motors in an existing machine and the access control assembly.

In another aspect this invention resides broadly in a method of controlling the operation of a plurality of gaming machines, the method including:

providing a key assembly to each user authorised to use a gaming machine, the key assembly having a data processing assembly including processor means and data storage means controlled by the processor means to store data relating to the use of the key assembly by the user, the data storage means receiving and storing credit data representative of the credit held by the user and identification data representative of the user for distinguishing a user authorised to use the key assembly and/or the gaming machine system;

inserting the key assembly in an access control assembly associated with each gaming machine in the gaming machine system, the access control assembly being adapted to receive the key assembly and having user identity verification means for verification of the identity of a user of a key assembly and a processing assembly including processor means and data storage means controlled by the processor means to store data relating to the use of the gaming machine by the user, the data storage means also receiving and storing data representative of the gaming machine and credit data representative of the credit held by the user;

verifying the identity of a user of a key assembly by comparison in the user identity verification means with identification data stored in the key assembly data storage means, whereby access by a user not authorised to operate a gaming machine in the gaming machine system is prevented and access by a user authorised to operate a gaming machine is allowed, and incrementing or decrementing the credit data stored in the access control assembly data storage means when a financial event associated with the key assembly is completed;

whereby, if the key assembly is not received in the access control assembly upon completion of a financial event associated therewith, the credit data stored in the key assembly data storage means can be incremented or decremented when the key assembly is next received in an access control assembly, and if the gaming machine is linked to a central computer, in circumstances where the gaming machine cannot communicate with the central computer, data stored in the access control assembly data storage means during the circumstances can be transferred to the central computer after cessation of the circumstances.

In a further aspect this invention resides broadly in a secure access control system including:

at least one key assembly having a data processing assembly including data storage means, the data storage means receiving and storing visual identification image data representative of a visibly identifiable physical feature of a user's body for distinguishing a user authorised to use the key assembly;

at least one access control assembly adapted to receive a key assembly, the access control assembly having a data processing assembly including processor means and data storage means, and visual identity verification means for visual verification of the actual visibly identifiable physical feature of the user of a key assembly by comparison with the image of the visibly identifiable physical feature stored in the key assembly data storage means, and interface means whereby an access control assembly can communicate with a received key assembly;

whereby use of the key assembly by an unauthorised user is detectable.

BRIEF DESCRIPTION OF THE DRAWINGS

In order that this invention may be more easily understood and put into practical effect, reference will now be made to the accompanying drawings which illustrate a preferred embodiment of the invention, wherein.

DETAILED DESCRIPTION OF THE INVENTION

Figure 1:
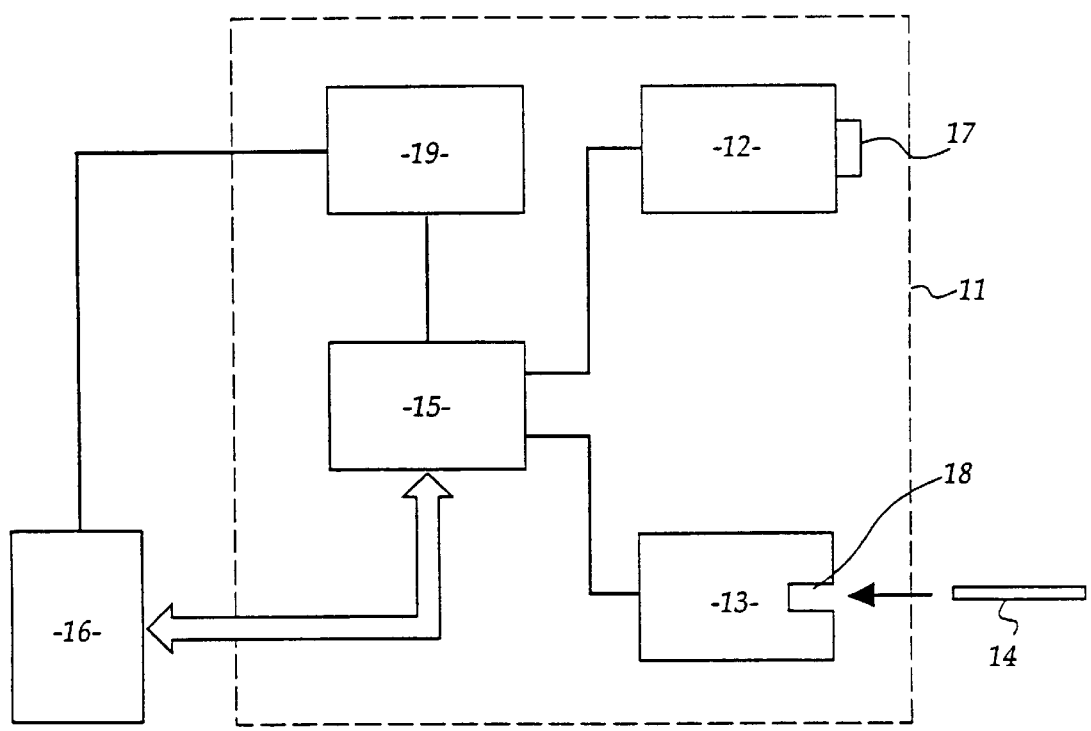
FIG. 1 is a simplified schematic block diagram of a secure access control system including visual identification means.

A visual identification access control system in accordance with one embodiment of the present invention will now be described with reference to FIGS. 1 to 3.

Visual identification access control system 11 comprises a visual sensor unit 12, an interface unit 13 arranged to interface with a key assembly memory storage device 14 and a processing means 15.

Control system 11 is connected to a secure system 16. The secure system is one which requires identification of a user before the user is allowed access to the system. Examples include automatic teller machines connected to central data base storing bank account information, and a control system where gaming devices are connected to a central controller storing account information. The visual identification system of the present invention is not limited to use with these examples.

Each user of secure system 16 is provided with a key assembly memory storage device 14 which contains image information relating to the visual facial appearance of the user. The memory storage device 14 may be an "intelligent key" containing a digital processing device and memory. The memory stores the image data in digital form. The interface unit 13 includes an intelligent key reader which interfaces with memory storage device 14 to obtain the digital image data from the memory. The interface unit 13 provides the processor means 15 with the digital image information obtained from the memory device 14.

The visual sensor unit 12 includes a camera 17 containing a charge coupled device (CCD) sensor and a lens positioned to view the face of a user standing by the apparatus. The CCD obtains a visual readout of the facial appearance of the user and the sensor unit 12 converts this visual readout into digital form which is transmitted to the processor unit 15.

The processor unit 15 compares the digital image information obtained from the visual sensor unit 12 with the digital information obtained from the interface unit 13. If the data from units 12 and 13 corresponds, processing means 15 determines that a positive identification has been made. That is, the person with the key assembly memory device 14 is the same person being viewed through the lens. The processor 15 may then indicate to the secure system 16 that a positive identification has been made and the user will then be allowed access to the secure system, eg to withdraw cash from a bank account.

Receiving means in the form of slot 18 is provided in unit 13 for insertion of intelligent key 14.

A keyboard 19 is also connected to the secure system 16. The keyboard may also be connected to the processor 15. The keyboard 19 allows a user to conduct transactions with the secure system 16. The number and type of keys provided on the keyboard 19 will depend on the functional requirements of the secure system 16.

Figure 2:
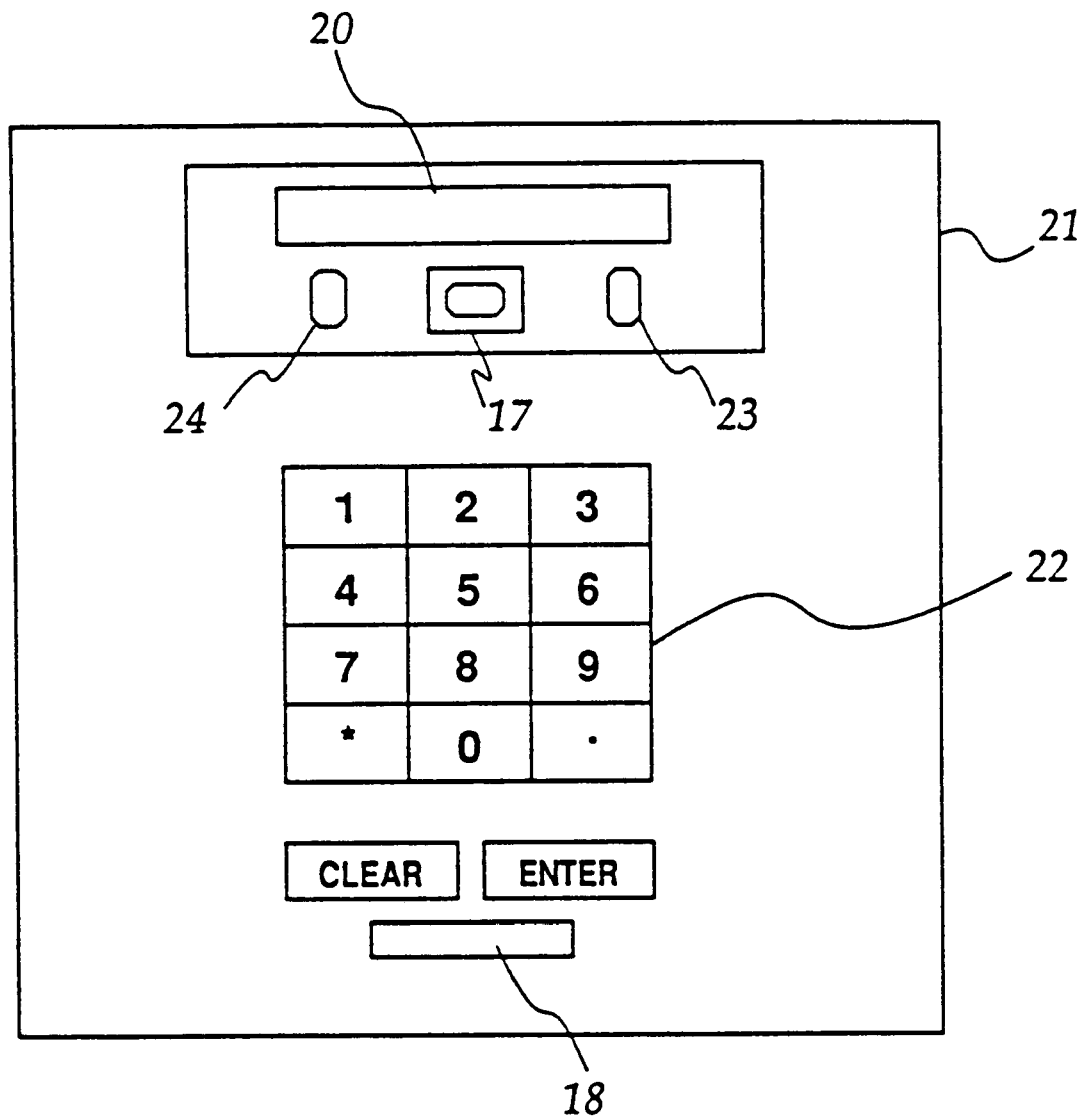
FIG. 2 is an illustration of a user interface assembly for use in the system of FIG. 1.

FIG. 2 shows a front view of the face 21 of user interface 13. (In this embodiment the keyboard 19 forms part of the interface unit 13.) A liquid crystal display 20 is provided for conveying information to the user. For example, the display may prompt the user to take necessary action to progress the identification process.

In this embodiment the user is also provided with a PIN number which is entered by keyboard 22 before access to the secure system 16 is enabled. The use of both a PIN number and the visual identification technique increases the security of the system.

In use, the display 20 can prompt the user to insert the key 14 into the slot 18. The user will then be asked to input the PIN number on the keyboard 22. If the PIN number is correct, the apparatus will proceed to the visual identification stage. A switch 23 is provided to cause the camera 17 to be activated to take a frame. The switch 23 may be activated by the user. A frame is taken by the CCD unit, converted to digital and transferred to the processor unit 15. The lighting conditions at the site are then altered (darker or lighter) and a second frame is taken by the CCD unit. A light sensor 24 is provided to detect lighting conditions. This frame is also converted to digital and transferred to the processor unit 15. The change of light conditions ensures that the diameter of the pupil of the eye of the user will change. This is a test to ensure that the face is that of a real person and not a photograph. The processor will determine whether the pupil diameter has changed and if there has been no change, access to the secure system 16 will be denied. If pupil identification has changed the visual identification process will proceed.

The image stored in the key and obtained by interface unit 13 is transferred to the processor means 15. A comparison is then carried out between the image from the unit 12 and the image from the interface unit 13.

Figure 3:
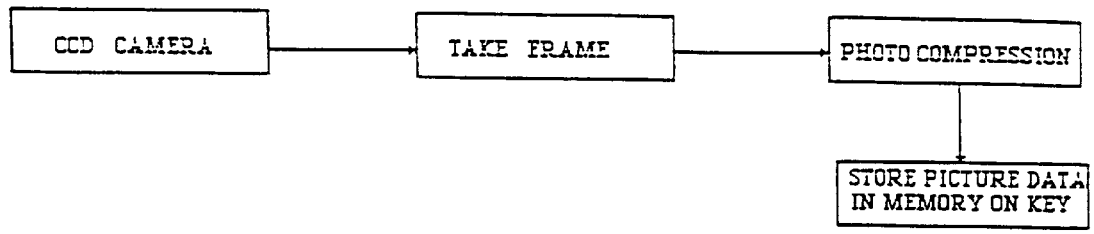
FIG. 3 is a flow diagram illustrating a photo identification process in the control system of FIGS. 1 and 2.
Figure 3:
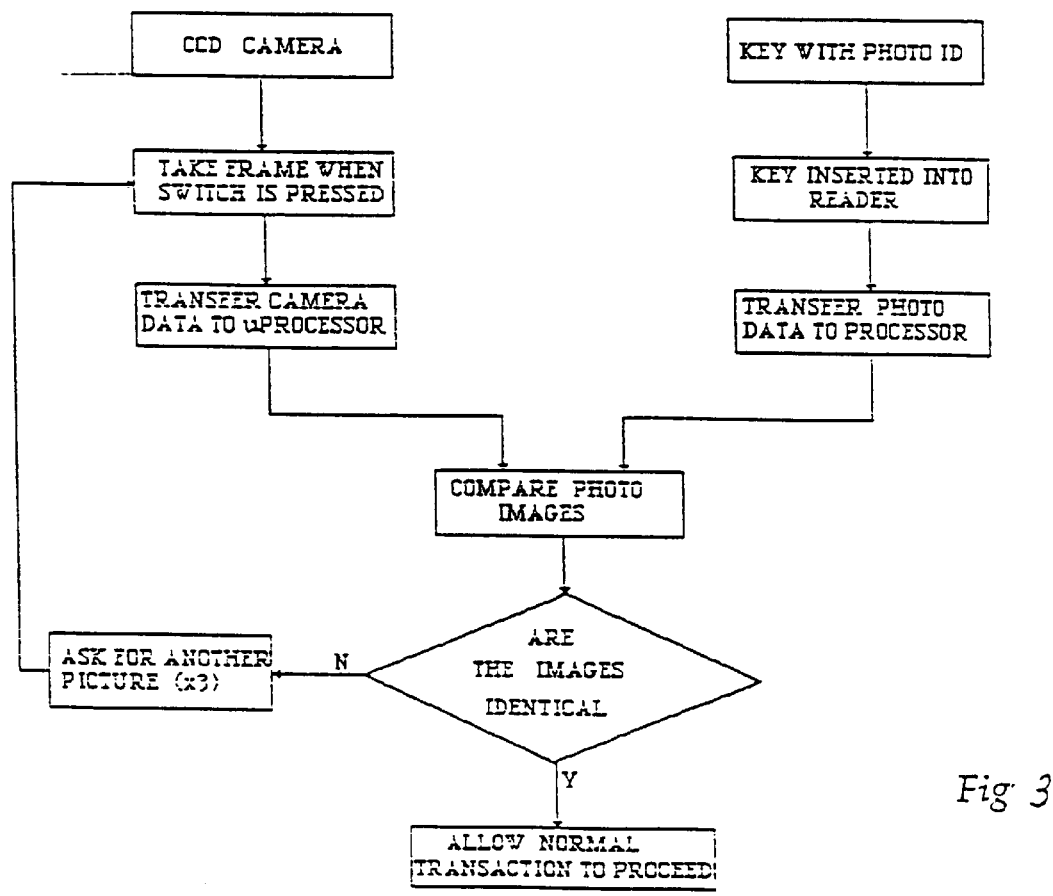

The flow chart of FIG. 3 is illustrative of the above process.

Figure 4:
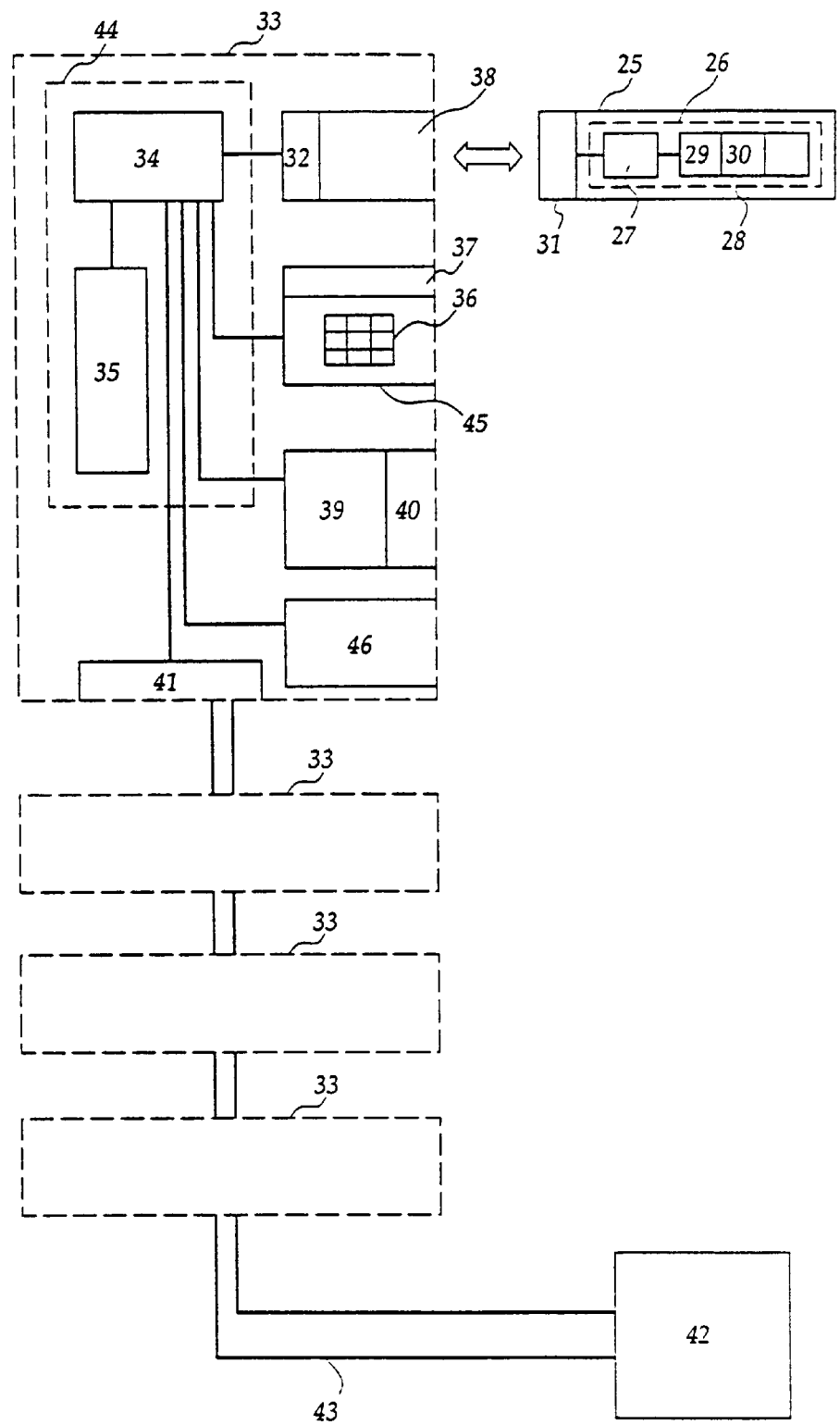
FIG. 4 is a detailed schematic block diagram of a secure access control system in accordance with the invention.

FIG. 4 is a detailed schematic block diagram of a secure access control system in accordance with the invention. A key assembly, user carriable device or memory storage device 25 includes data processing assembly 26 having a central processor or digital processing device 27 and data storage means 28 for storing identification data 29 and image data 30. Interface 31 provides communication between key assembly 25 and an access control assembly 33.

Access control assembly 33 includes a data processing assembly 44, user interface assembly or interface unit 45, receiving means 38 for receiving key assembly 25, and identity verification means 39.

Data processing assembly 44 is controlled by a central processor 34 and includes data storage means 35. User interface assembly 45 includes input means in the form of keypad 36 and information display means 37 in the form of a liquid crystal display as previously described. Receiving means or keyslot 38 includes an interface 32 for providing communication with key assembly 25. Identity verification means 39 in the form of processor means adapted to compare information is associated with a sensing means, sensor or visual sensing unit in the form of a camera 40 as previously described. Image display means 46 in the form of a video screen is provided at the access control assembly 33 to display a screen picture of the face of the legitimate holder of the key assembly 25. Interface means 41 is adapted to provide communication between access control assembly 33 and other access control assemblies and a central computer assembly or control unit 42 via communication bus 43.

A gaming establishment control system which incorporates an operating system in accordance with an embodiment of the present invention will now be described with reference to FIGS. 5 to 14.

Figure 5:
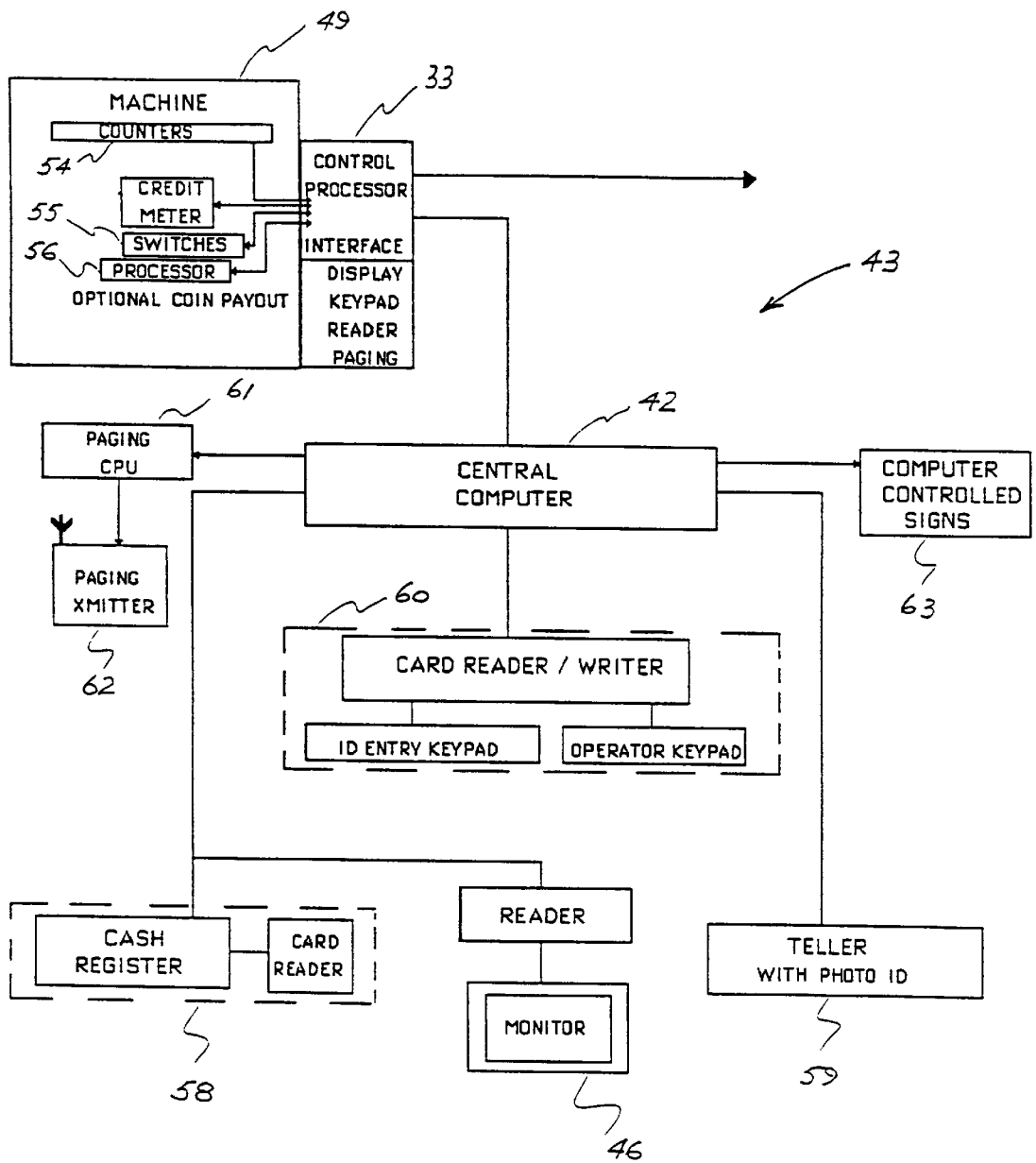
FIGS. 5, 6 and 7 are schematic block diagrams of a secure access control system for a gaming establishment.
Figure 6:
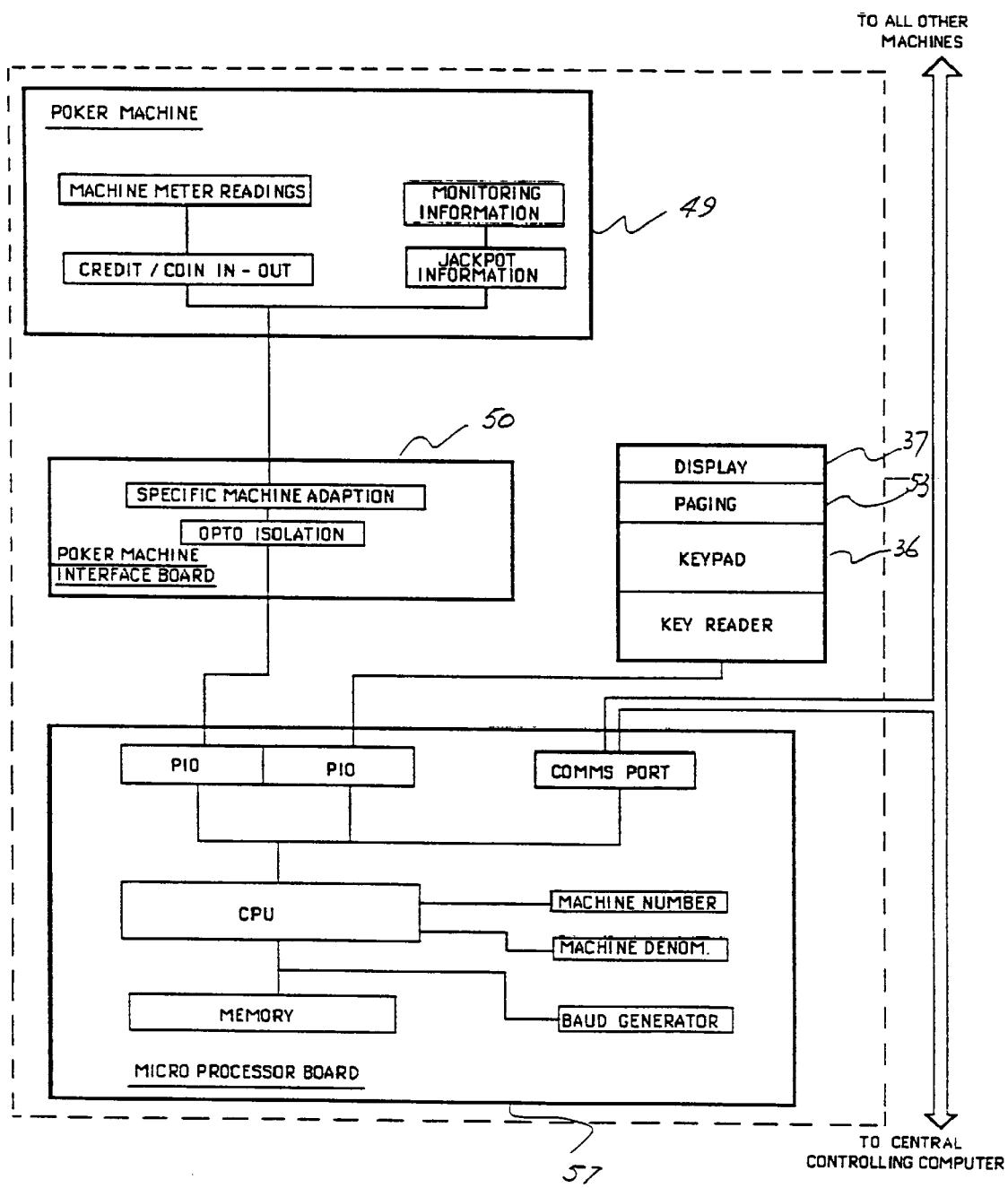

With reference to FIGS. 5 and 6, the control system comprises a central computer 42 for controlling operations of the system. A communication system generally designated by reference numeral 43 connects the central computer 42 to peripheral units. A plurality of gaming machines 49 are connected to the control system. Poker machines incorporate counters 54 for counting the number of credits input to a machine and taken out of the machine during a predetermined playing period and for monitoring sundry other machine operations, switches 55 controlled by a keyboard for operation of the machine and coin in/out meters 56 which provide a number of pulses when coins are input or taken out of the machine. Conventional poker machines are coin operated and prizes may be paid out in coins at the machine. This embodiment of the present invention enables operation of poker machines without the need to insert coins. Further, no coin pay out is necessary when a prize is won.

A large gaming establishment may have many hundreds of poker machines. All these poker machines may be connected in the control system of the present embodiment of the invention. The control system includes an access control assembly 57 associated with each poker machine 49. Each access control assembly 57 is connected in a loop format in which each assembly for each poker machine is connected. The loop is connected to the central computer 42. Serial data lines are used for the loop communication system. Two serial data communication lines are employed, one for carrying data and the other being supervisory. Depending on how many machines 49 are to be connected in the control system, a plurality of loops may be employed.

The control system also incorporates a number of other types of terminals, apart from the gaming device access control assemblies 57, which are also connected to the central computer by the communication system 43. These include remote cash register units 58, remote auto-teller units 59, and credit/debit terminals 60.

The central computer 42 is also connected to a paging system 52 having CPU control unit 61 and paging transmitter 62. These provide a paging service. The computer is also connected to computer controlled signs 63, which may be for the purpose of advertising, providing linked jackpot information etc.

The system constitutes a complete control system for monitoring operation of the gaming establishment. Transactions with each machine 49 can be monitored by the central computer 42. In addition, financial transactions at other points in the establishment, such as at the bar or restaurant, can also be monitored by the central computer. The paging function enables services to be provided to users of the machine 49 without the users needing to leave their seat by the machine. Keyboard means such as keys 53 as described with reference to FIGS. 7 and 8 and associated with the access control assembly 57 are actuable to instigate a paging function to call a service operator to attend to the needs of the user, depending upon the key actuated on the user assembly 45.

Figure 7:
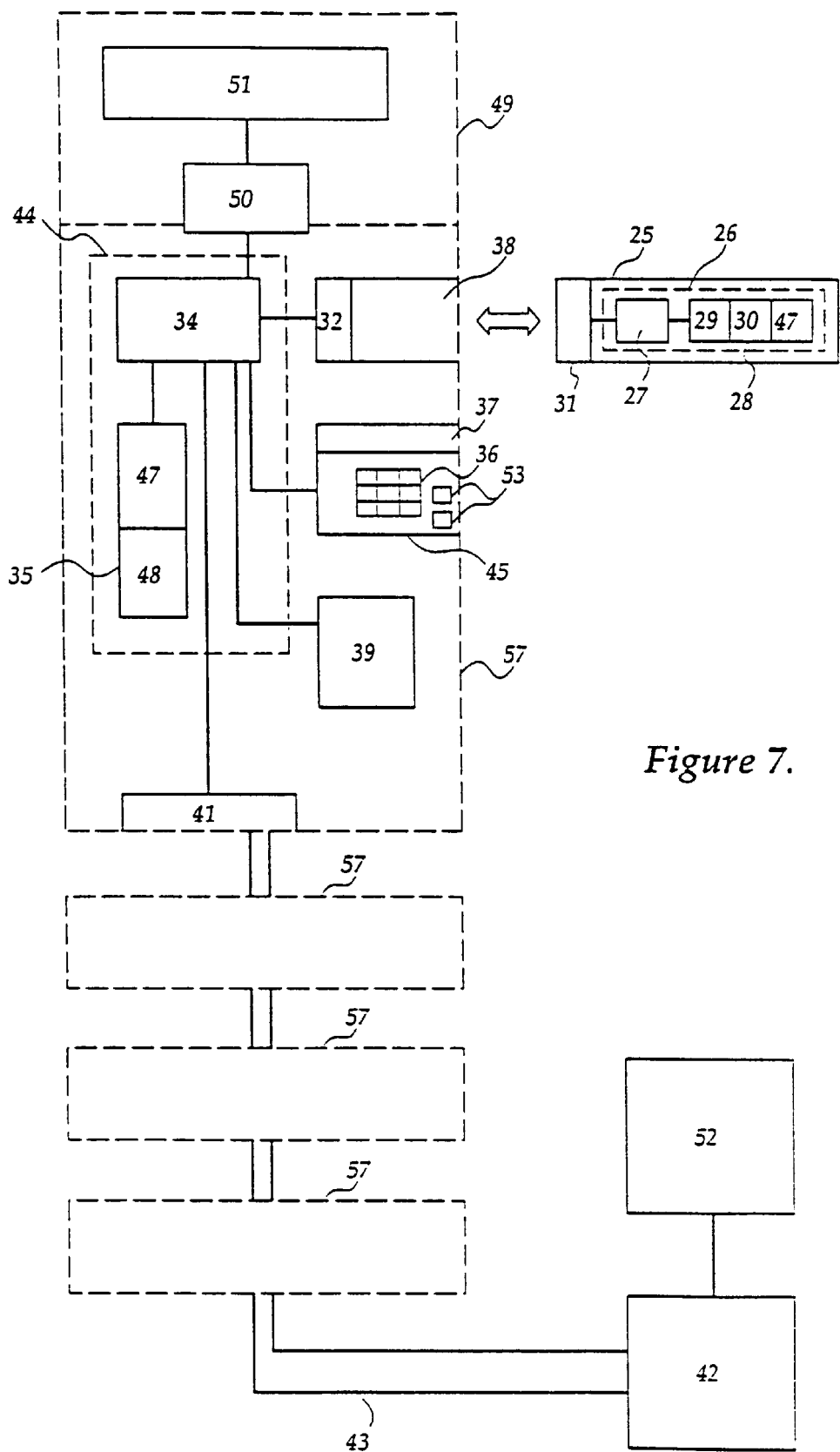

Gaming machines for use in the operating system of this invention may be custom-built for use therewith. As seen in FIGS. 6 and 7, to enable older machines to be used in the operating system the gaming machines 49 have a retrofit interface board 50 which includes adaptor circuits specific to a given machine for providing data transfer between an existing processor unit and access control assembly 57. Some older machines do not allow access to the processor unit and interface board 50 provides data transfer between photo-optic coin sensors, solenoid switches and motors and access control assembly 57.

Figure 8:
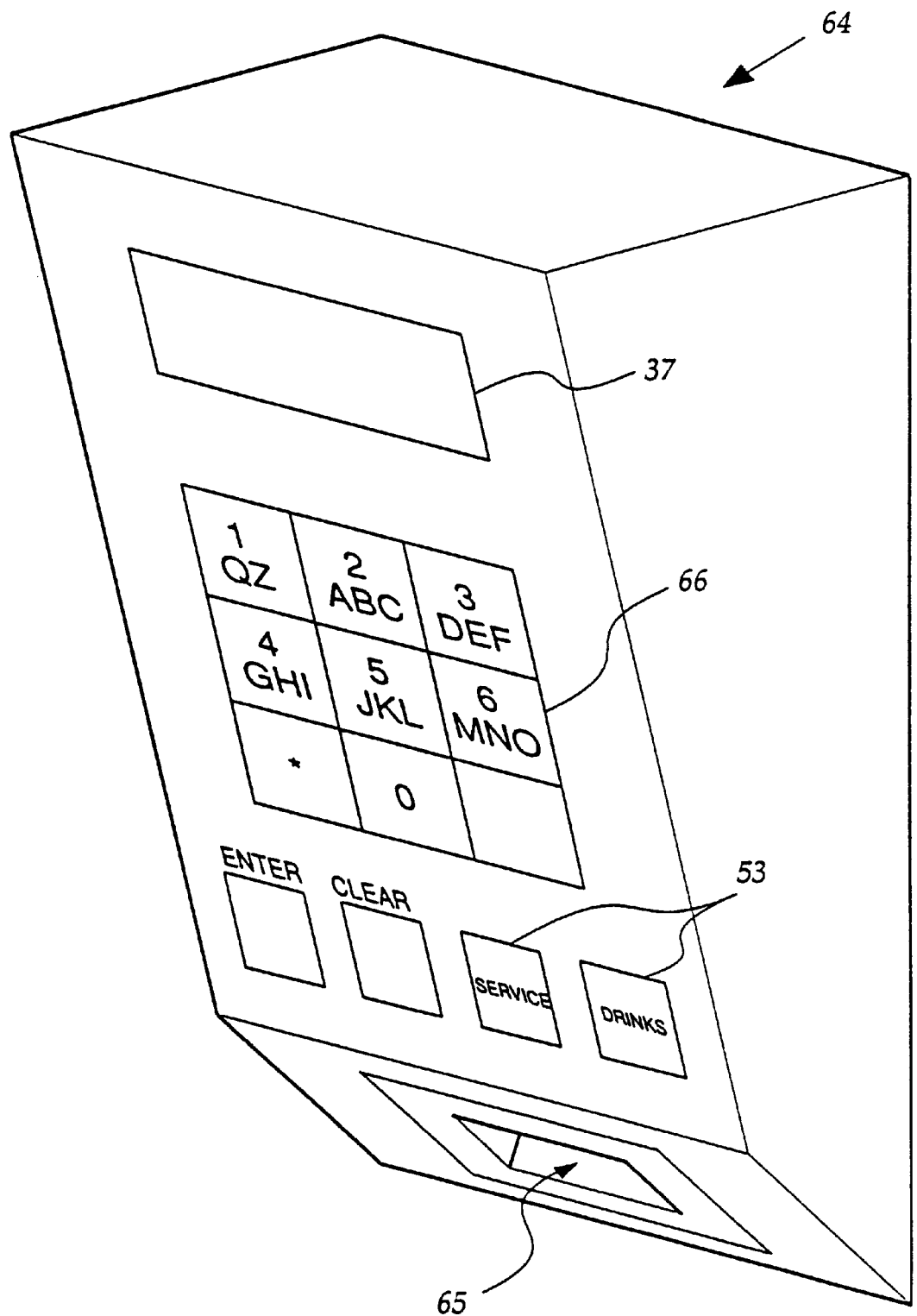
FIG. 8 illustrates a player interface assembly for association with a gaming machine.
Figure 9:
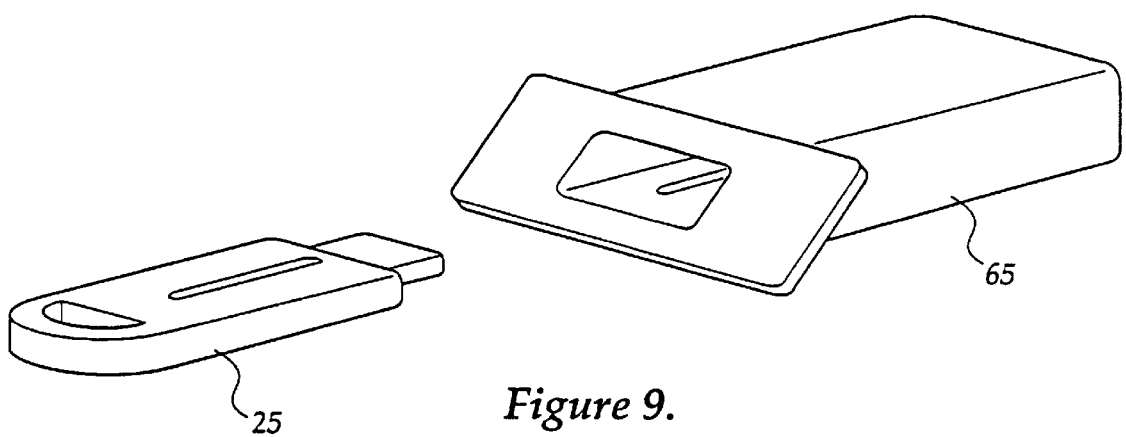
FIG. 9 is a perspective view of a key assembly and housing therefor.
Figure 10:
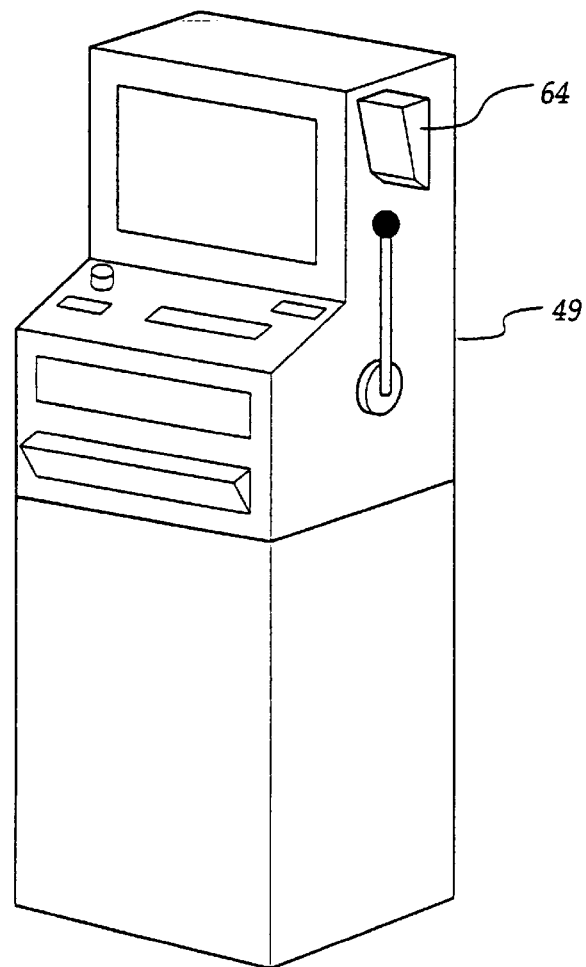
FIG. 10 illustrates a player interface assembly attached to a poker machine.
Figure 11:
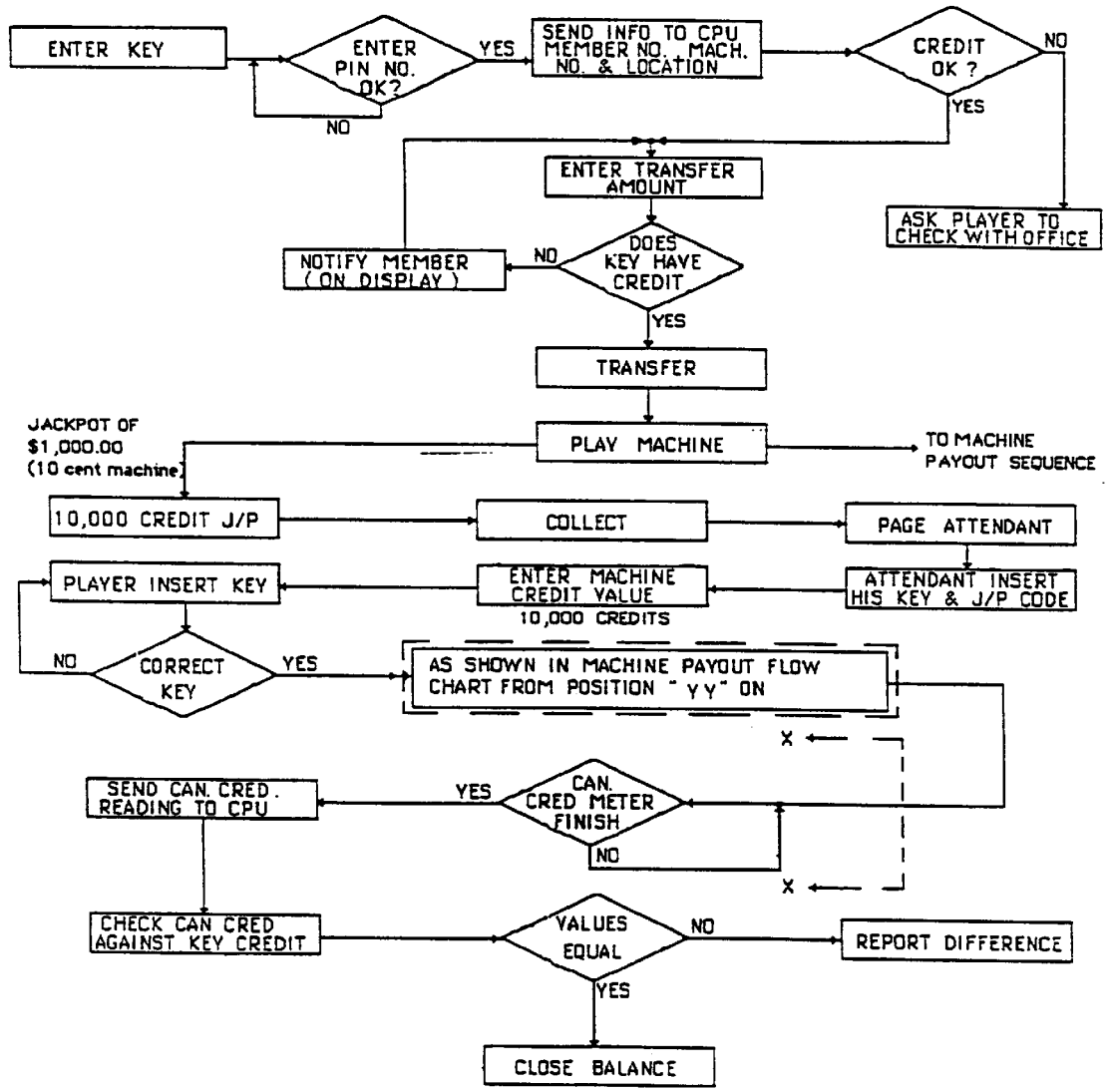
FIG. 11 is a flow diagram illustrating a machine playing sequence for a gaming machine connected in the control systems of FIGS. 5, 6 and 7.
Figure 12:
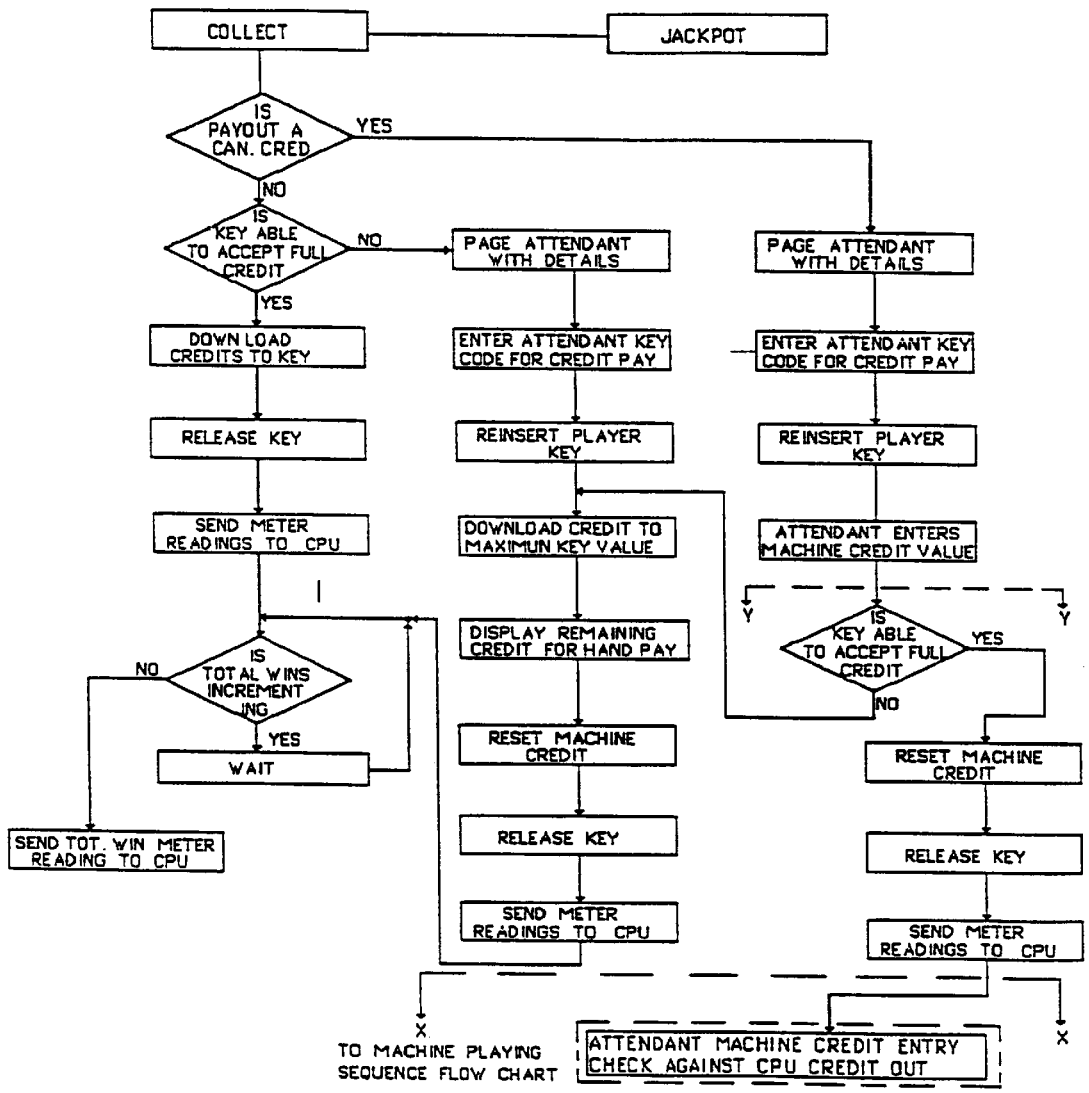
FIG. 12 is a flow diagram illustrating a machine pay out sequence for a gaming machine connected in the control systems of FIGS. 5, 6 and 7.
Figure 13:
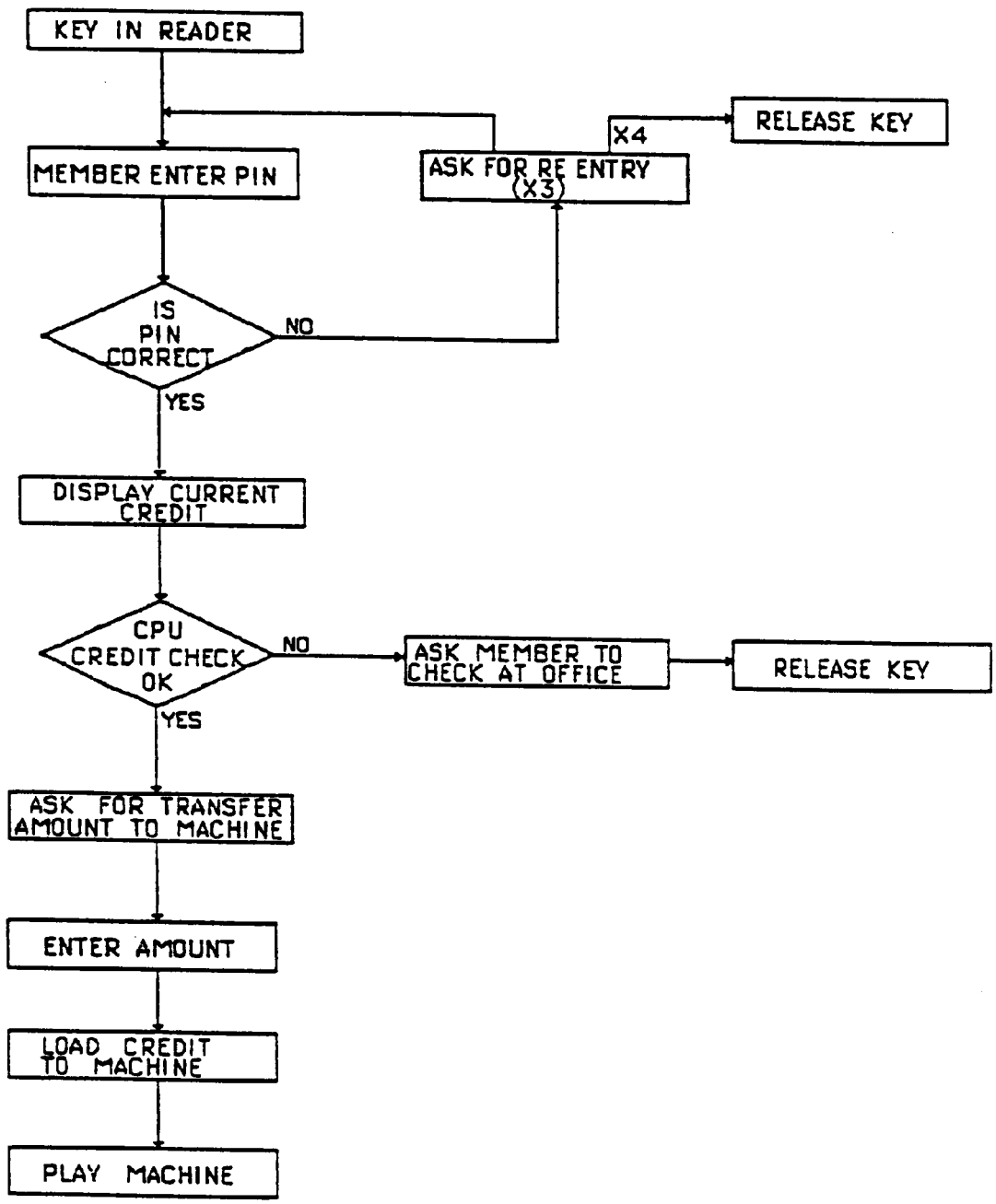
FIG. 13 is a flow diagram illustrating entry of machine credit to a gaming machine connected in the control systems of FIGS. 5, 6 and 7.
Figure 14:
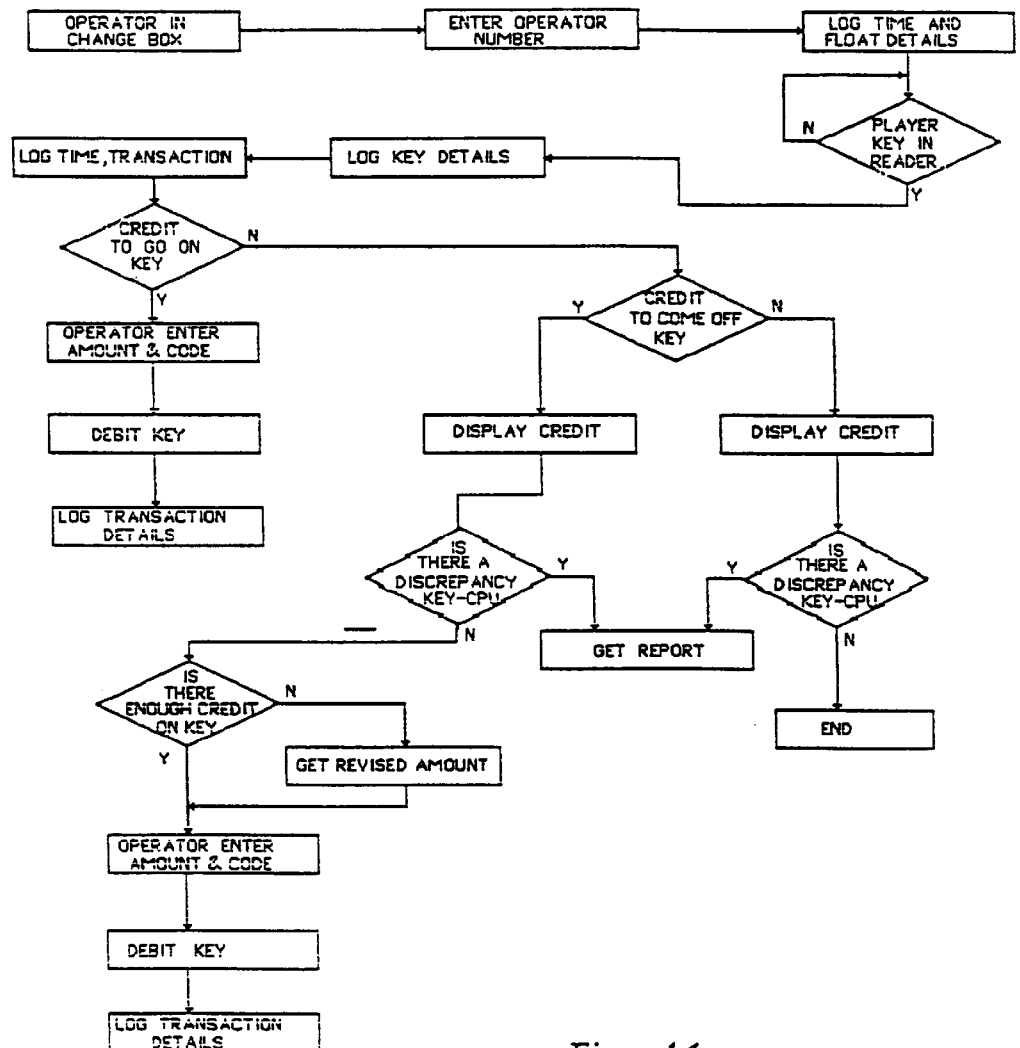
FIG. 14 is a flow diagram illustrating operation of a central crediting system connected in the control systems of FIGS. 5, 6 and 7.

FIG. 8 illustrates a user interface unit 64 to be mounted on each machine 49 as shown in FIG. 10. The unit 64 is operable by the user on insertion into the key slot 65 of an intelligent key 25 containing a micro processor and memory store. Key slot 65, which with key 25 is illustrated in perspective view in FIG. 9, is installed in user interface unit 64 with an upwards inclination so that the drinks of users if accidentally spilled, will not collect in the slot. It will of course be realised that the interface unit may be built into the gaming machine and that in the case of video machines, the display means can be the video screen.

To obtain access to the machine 49, the user inserts intelligent key 25 into the key slot 65 and enters the PIN number by actuation of the appropriate keys on the keyboard 66. The intelligent key 25 contains in its memory credit information indicating the amount of credit available to the owner of the key for playing the machines 49. Whether the player has enough credit on the key will be checked by the unit 64 and if approved the player will be allowed to play machine 49. The player may play the machine with any amount of credit available on the key 25. As credit is entered to play the machine it is debited from the key 25. As described subsequently with reference to the "machine player system" and FIGS. 11 and 13, key 25 must be removed from keyslot 65 before play can be commenced. Winnings are credited to the memory store on the key when the key is reinserted in keyslot 65.

The control system will also "double check" the credit on the key with account information for the user held on data base by the central computer 42. This check is preferably carried out before play commences. If there is an inconsistency between the account on central data base and the credit shown on the key, the user will be asked to report to an office of the gaming establishment and will not be allowed to play the machine.

The user's account on the central computer 42 may also be updated in response to playing the gaming machine 49. If a user's account or key has no credit, credit may be obtained at a change box having debit/credit unit 60. If the user deposits money at the change box it will be credited to both key and account by the debit/credit unit 60. The player can then proceed to play a machine.

The central computer 42 may also obtain other transaction information from the machines 49. Any information required for audit purposes may be obtained by the central computer 42 in this manner. There is no need for an operator to physically attend a machine except in cases of malfunction. The central computer 42 continually polls the machines for data.

If a user requires a service function or a drink at the machine, the appropriate button 53 on the keyboard is pressed and a service operator will be paged by the paging system. The central computer 42 detects that a paging operation is required and causes the paging CPU 61 to cause a paging transmission via paging transmitter 62 to page a designated operator by a remote paging unit. The designated operator can then approach the user to carry out the required service. If a drink or other service is to be provided which will cost the user money, the user may pay for it by debiting credits from his key. This can be done at the user interface unit 64.

Any number of desired paging functions can be carried out by the paging CPU 61. The paging system is responsive not only to users, and a facility is provided for automatically paging service operators in some circumstances.

For example, if a key is accidentally left in machine 49 after a predetermined time the service operators are paged with an appropriate message. If credits are accidentally left on a machine the attendant will again be paged with an appropriate message after the elapse of a given time without machine activity. The attendant can then clear the machine by inserting an operator key and entering a code. The computer 42 will be updated with the member's new credit. This will cause a discrepancy between the member's key and the credit in the central computer, and the next time the member plays a machine the display 37 will signal to the member to check at the change box. The key credit can then be updated by the cashier.

In order to obtain cash the user utilises a change box or reception 60. Money can be collected from the change box and the key credit will be debited.

Key reader units 58 are provided at the bar, restaurant and at other locations to enable a user to use a key to obtain other services. These units are also connected to the central computer 42 to update account information.

Auto-teller units 59 are also provided and may have a facility for visual identification in accordance with the first aspect of the present invention.

FIG. 7 is a detailed schematic block diagram of an operating system for a number of gaming machines 49 utilising a secure access control system 57 in accordance with the invention. A key assembly, user carriable device or memory storage device 25 includes data processing assembly 26 having a central processor or digital processing device 27 and data storage means 28 for storing identification data 29, image data 30 and credit data 47. Interface 31 provides communication between key assembly 25 and access control assembly 57.

Access control assembly 57 includes a data processing assembly 44, user interface assembly or interface unit 45, receiving means 38 for receiving key assembly 25, and identity verification means 39. Access control assembly 57 can be connected to a gaming function 51 by a retrofit interface unit 50 as previously described.

Data processing assembly 44 is controlled by a central processor 34 and includes data storage means 35 for storing credit data 47 and gaming machine data 48. A user interface assembly 45 includes input means in the form of keypad 36, information display means 37 in the form of a liquid crystal display and paging means or buttons 53 as previously described. Receiving means or keyslot 38 includes an interface 32 for providing communication with key assembly 25. Identity verification means 39 in the form of processor means is adapted to compare information. Interface means 41 is adapted to provide communication between access control assembly 33 and communication bus 43 for communication with other access control assemblies and a central computer assembly or control unit 42 and to a paging system 52.

It will be realised that a cashless system can be provided in accordance with the invention in which the intelligent key contains an electronic photo ID facility, key number, user function (member, attendant, operator), user details (name, address) and transaction details.

The key holder has a PIN code which is not accessible to operators. Transactions are stored and reported by key number and not by member name. The key can be used for different clubs with the data of one club not being accessible by other clubs. The key is thus extremely secure and cannot be copied.

Key readers are provided on each machine, at each entrance with monitors for photo ID check, at each payout area optionally with an ID monitor, at each bar service area, at reception area with camera for new membership, and at automatic tellers with reader/writer/camera.

FIGS. 11 to 14 are self-explanatory flow charts showing machine playing sequence, machine pay out sequence, entry of credit into the machine and operation of the central crediting system. The following brief summaries outline operation of the system in a club or casino and should be read in conjunction with FIGS. 11 to 14.

Credit System

Member pays for credits at change box.
Member key inserted in reader, enters PIN number.
Operator checks details and enters credit amount.
Credit placed on key and key ejected.
Transaction with member, operator, amount, date logged on CPU.

Machine Player System

Insert key in machine.
Display asks for PIN number.
Enter PIN number.
Main CPU checks details and credit.
Display asks for amount required to be entered in machine.
Enter amount.
Credit on key and CPU are updated.
Key removed.
Coin credit meter on machine incremented.
When play finished insert key in reader and press "collect" on poker machine.
Key and CPU updated with credits and machine coin credits cancelled.
Remove key.
If a key is accidentally left in a machine after a predetermined time the attendants are paged with a message indicating a key may be left in the machine.
If there are no credits left on the machine at the end of play there is no need to insert the key—the machine will automatically be released after predetermined time.
A member may reserve a machine, with credits on it, and without having his key actually in the machine, and get a drink etc—the machine will not accept any other key (except an attendants) when in this mode.
If credits are accidentally left on a machine the. attendant will again be paged with an appropriate message after a time without machine activity. The attendant can then clear the machine by inserting his key and entering a code. The CPU will be updated with the members new credit. This will give a discrepancy between the member's key credit and the credit in the CPU. The next time the member plays a machine he will be asked by the display to check his credits at the change box. The key credit will then be updated by the cashier (a message with the reason for the update will be given at their terminal).

Payout

Money collected from key credit at change box, automatic teller.
Key inserted in reader.
PIN number entered.
Credit amount checked by CPU
Photo ID if required.
OK given to operator.
Record again kept of transaction

Machine Attendants

Attendants have their own keys.
Log on/off duty can be performed.
Key inserted in machine before any service.

Reports

Reports can be generated by management by selecting their own set of specifications from the database.
Examples include:

| | |
|---|---|
| Cash in | from credits entered to keys |
| Cash out | from key credits cashed in |
| Key Credits | credit on keys not claimed |
| Bar Cash | key credits used at bar |
| | cash taken at bar |
| Meter Readings | all functions |
| Player Activity | types of players, machines, |
| Restaurant Cash | cash credits used |
| | cash taken |
| Entertainment | key credits used |
| | cash taken |

It will be appreciated that a secure access control system in accordance with the present invention has many advantages.

The provision of a secure intelligent user key, on-site processor storage capacity and the ability to check identity on site without the necessity to revert to a central computer, enables stand-alone operation and means there is little restriction on the number of sites which can be run on a single extended network. Integration of an internal paging system enables automatic reporting on all important events within the system to users who are potentially concerned with an event, and provides extremely efficient utilisation of human resources. Furthermore, it offers immediate service to customers and users in casino-type installations.

The system allows for both supervisory control and data transfer whereby multiple facilities can be provided with minimum congestion. Electronic signs such as general information, jackpot information and advertising can be easily controlled and it is possible with the system to provide inter-establishment jackpots as well as internal jackpots.

The secured access control system in accordance with this invention also provides a facility for central updating whilst monitoring all sites, and generates virtually real time information from all sites.

The paging facilities provide automatic ordering of goods on site, jackpot information for management, machine reserve reporting and indicates to staff the need to service machines. These capabilities provide significant advantages in clubs, casinos and the like.

It will be realised that a central computer failure does not cause the system to fail and that individual operations can continue on-site because of the provision of on-site processor facilities and the high level security provided by the intelligent card. The central computer is updated when it comes back on-line.

Linked jackpot facilities can only be provided satisfactorily with on-line systems and the utilisation of linked jackpots is facilitated by the present invention because of the instant automatic paging facilities which are available if problems occur. Provision of such a system is desirable for the smooth operation of linked jackpots.

It will also be realised that the system according to the present invention overcomes certain problems of the prior art and in particular provides for the automatic update of player records and so does not rely on a player having to hand in a key in order for the centralised computer to access information for collation and analysis. This is one disadvantage with the system outlined in Australian patent application 72657/91 because of the fact that it is usual for players at casinos to lose their credit and there is thus often little incentive for a player to return a key to a central location.

Moreover as has been described above in the outline of the "machine player system", the gaming system in accordance with the present invention ensures that cards are not inadvertently left in machines when credit has expired and the cards are spent. This results from the system not allowing a game to be played or gambling to commence before the key assembly is removed from the keyslot. This overcomes disadvantages of prior art arrangements in which keycards are commonly left in the machines. In these systems, although a discrete amount of credit may be downloaded prior to a period of play commencing, the card remains in the keyslot for updating either with each event or at the conclusion of a period of play. On the other hand the key assembly of the present invention is most usually in the players hand or pocket and will be in this location, rather than in the machine slot, when credit on the card is exhausted.

Furthermore, by providing a system in which individual debits are incremented each time a machine is played, the system of this invention overcomes disadvantages of earlier "cashless" systems in which the total amount of credit is downloaded into the machine when the player's card is inserted in the machine and read by the card reader. This is of particular significance if, as is usual, regulatory authorities require an electro-mechanical counter to be maintained in machines even if operation is controlled by a CPU. The downloading of a large number of credits, for example when a relatively large cash deposit is made when a card is inserted into a small value machine, means that such a counter can fail due to excessive mechanical wear or the machine is either ineffective or substantially inoperable for the time taken for the machine to increment the total number of credits.

Furthermore, intelligent processors in known systems do not contain player credit information and it is necessary that the player's card be accessed in order to obtain such information. Security is thereby compromised because the card and the machine do not both contain updated credit records and the card itself can be subjected to electronic tampering.

The invention thus provides a practical "cashless" casino operating system which is able to support a very large number of gaming machines without the need to provide a high powered and expensive central computer system.

It will of course be realised that whilst the above has been given by way of an illustrative example of this invention, all such and other modifications and variations hereto, as would be apparent to persons skilled in the art, are deemed to fall within the broad scope and ambit of this invention as is hereinafter claimed.

I claim:

1. A gaming machine operating system including:
   a plurality of gaming machines;
   a central computer assembly;
   communication means for transferring data from said gaming machines to said central computer assembly, and
   a secure access control system including:
      for each user of the gaming machine system, a key assembly having a data processing assembly including key assembly processor means and key assembly data storage means controlled by said key assembly processor means to store data relating to the use of said key assembly by said user, said key assembly data storage means receiving and storing identification data representative of said user for distinguishing a user authorized to use at least one of said key assembly and the gaming machine system, and
      for each gaming machine in the gaming machine system, an access control assembly associated with said gaming machine and adapted to receive said key assembly, said access control assembly having user identity verification means for verification of the identity of a user of a key assembly by comparison with said identification data stored in said key assembly data storage means, and a processing assembly including access control assembly processor means and access control assembly data storage means controlled by said access control assembly processor means to store data relating to the use of said gaming machine by said user, said access control assembly data storage means also receiving and storing data representative of said gaming machine, and
      interface means for each gaming machine whereby an access control assembly can communicate with a received key assembly;
      whereby, in use in circumstances where the gaming machine cannot communicate with said central computer, access by a user not authorized to operate a gaming machine in said gaming machine system can be prevented, and access by a user authorized to operate a gaming machine can be allowed, and, if a user is allowed access to operate a gaming machine in said circumstances, data relating to the use of the key assembly by said user during said circumstances is stored in said key assembly storage means and said access control assembly data storage means, data stored in the access control assembly data storage means during said circumstances being transferable to said central computer by said communication means after cessation of said circumstances wherein said interface means for each gaming machine is included in a respective access control assembly and wherein a respective gaming machine is inoperable when a key assembly is received within a respective interface means.

2. A gaming machine operating system as claimed in claim 1, wherein said key assembly data storage means and the access control assembly data storage means each stores credit data representative of the credit held by a designated user, the credit data stored in said access control assembly data storage means being incremented or decremented when a financial event associated with the key assembly is completed.

3. A gaming machine operating system as claimed in claim 1, wherein if said key assembly is not received in said access control assembly upon completion of a financial event associated therewith, the credit data stored in said key assembly data storage means is incremented or decremented when said key assembly is next received in an access control assembly.

4. A gaming machine operating system as claimed in claim 1, and including a paging system for transferring messages and paging signals from said gaming machines.

5. A gaming machine operating system as claimed in claim 4, wherein said user interface facility includes paging means whereby a user can access said paging system.

6. A gaming machine operating system as claimed in claim 1, wherein said gaming machines include retrofit interface means for providing data transfer between a processor unit in an existing gaming machine, or between photo-optic coin sensors, solenoid switches and motors in an existing machine, and the access control assembly in said gaming machine.

* * * * *